United States Patent [19]

Inokuchi

[11] Patent Number: 4,660,967
[45] Date of Patent: Apr. 28, 1987

[54] HOT CATHODE FLUORESCENT TUBE ILLUMINATION SYSTEM

[75] Inventor: Toshiyuki Inokuchi, Yokohama, Japan

[73] Assignee: Ricoh Company, Ltd., Tokyo, Japan

[21] Appl. No.: 592,119

[22] Filed: Mar. 22, 1984

[30] Foreign Application Priority Data

Mar. 30, 1983 [JP] Japan .................................. 58-52479

[51] Int. Cl.$^4$ ........................ H01J 63/02; G03B 27/54
[52] U.S. Cl. ...................................... 355/67; 313/496; 313/110; 362/223
[58] Field of Search .............. 313/495, 496, 497, 110; 362/223, 224, 260, 335, 347, 361; 355/67, 68, 70, 71

[56] References Cited

U.S. PATENT DOCUMENTS 4,348,105 9/1982 Caprari .................................. 355/67
4,387,322 6/1983 Nixon .................................. 313/497

FOREIGN PATENT DOCUMENTS 43757 3/1980 Japan .................................. 313/496

Primary Examiner—Palmer C. DeMeo
Assistant Examiner—K. Wieder
Attorney, Agent, or Firm—Cooper, Dunham, Griffin & Moran

[57] ABSTRACT

A slit light emitting type hot cathode fluorescent tube illumination system including at least one substrate, a plurality of strip anodes, a plurality of fluorescent substance layers each superposed on one of the anodes, and hot cathode filaments located above top surfaces of the fluorescent substance layers for emitting thermoelectrons exciting the fluorescent substance layers to emit light for illuminating an original by slit illumination. A cylindrical lens is located in a path of the light emitted by the fluorescent substance layers in such a manner that the generating line of the cylindrical lens is parallel to the length of the fluorescent substance layers. The substrate and cylindrical lens cooperate with each other to provide an illumination system in tubular form, with the aid of a side plate when necessary.

19 Claims, 12 Drawing Figures

HOT CATHODE FLUORESCENT TUBE ILLUMINATION SYSTEM

FIELD OF THE INVENTION

This invention relates to a slit illumination system suitable for use with an exposing optical system of an electrophotographic copying apparatus and an image information read-out device of a facsimile system, digital copying apparatus, etc.

BRIEF DESCRIPTION OF THE DRAWINGS

FIG. 3(a)-6(a) are sectional views of various embodiments of the hot cathode fluorescent tubes in conformity with the invention;

FIGS. 3(b)-6(b) are sectional views of examples of arrangement of the hot cathode fluorescent tubes shown in FIGS. 3(a)-6(a), respectively, with respect to image forming optical systems.

DESCRIPTION OF THE PRIOR ART

In electrophotographic copying apparatus, facsimile systems and digital copying apparatus, a halogen lamp, a fluorecent lamp or a light emitting diode array is used as a light source for effecting slit illumination of images. These light sources have suffered various disadvantages. The halogen lamp is inordinately high in electric energy consumption with respect to its degree of luminescence and generates a large amount of heat. The fluorescent lamp requires a tube of a greater length than its effective length because the luminescence distribution lengthwise of the lamp is low at opposite end portions, and the construction of the lamp becomes complex. The disadvantages of the light emitting diode array include variations in light emitting capability, low degree of illumination and high cost.

Figure 1A:
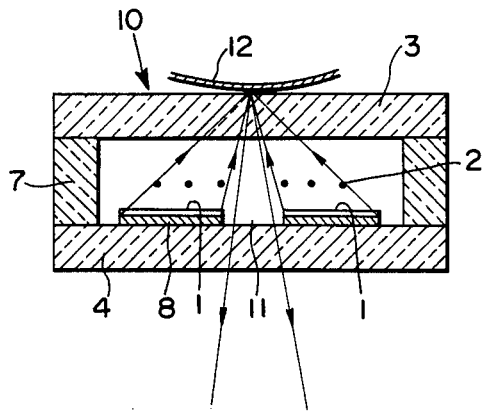
FIG. 1(a) is a sectional view of one constructional form of hot cathode fluorescent tube of the prior art.

In recent years, a hot cathode fluorescent tube of the slit light emission type has been developed for use as a source of light for effecting slit illumination of images, and the aforesaid disadvantages of the light sources of the prior art have been obviated. FIG. 1(a) shows one example of a hot cathode ray fluorescent tube which comprises strip anodes 8 supported on a glass substrate 4 and fluorescent substance layers 1 each placed on top of one of the strip anodes 8 to provide a plurality of fluorescent units which are disposed in spaced juxtaposed relation with a slit 11 therebetween and each have hot cathode filaments 2 arranged above them. Two side plates 7 are located on opposite ends of the glass substrate 4, respectively, in upright position in parallel relation, and a face glass member 3 is supported by the side plates 7 and disposed parallel to the glass substrate 4, to provide a sealed fluorescent tube 10.

Figure 1B:
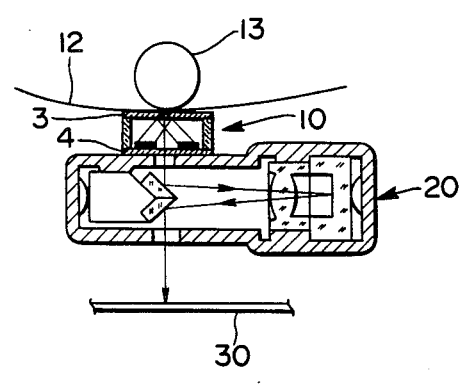
FIG. 1(b) is a sectional view of one example of the arrangement of the hot cathode fluorescent tube of FIG. 1 with respect to an image forming optical system.

As a voltage is impressed on the hot cathode filaments 2, thermoelectrons are emitted by the filaments 2 and applied to the anodes 8 to excite the fluorescent substance layers 1 which emit fluorescent light for performing slit illumination of an original 12 conveyed along a top surface of the face glass member 3 as shown in FIGS. 1(a) and 1(b). The light is reflected by the original 12 and passes through the slit 11 between the fluorescent units 1, 8 in the interior of the fluorescent tube 10, before being transmitted through the glass substrate 4 and led to an image forming optical system 20, which forms an optical image on a photosensitive member or a contact type image sensor 30.

In the hot cathode fluorescent tube 10 of the aforesaid construction which is referred to as an "inside image guide type" because the image forming light beam reflected by the original 12 passes through the interior of the fluorescent tube 10, the image forming light beam is transmitted through the glass subtrate 4 and led out of the tube 10. Thus, it is essential that the glass substrate 4 have a high degree of transparency and perfect flatness. The original 12 is illuminated by slit illumination techniques when it reaches an illumination position disposed at the center line of the face glass member 3 while being conveyed along the top surface of the face glass member 3 formed of flat glass sheet. Thus, it is only a portion of the light emitted by the fluorescent substance layers 1 that is used for illumination purposes, and the rest of the light is reflected by the face glass member 3 and side plates 7 which are also formed of glass, thereby producing a large amount of flaring light and reducing illumination efficiency. Vibration of the hot cathode filaments 2 might produce a flicker of light.

SUMMARY OF THE INVENTION

This invention has been developed for the purpose of obviating the aforesaid disadvantages of the hot cathode fluorescent tube of the slit light emitting type which is superior to light sources of the prior art for performing slit illumination for a copying apparatus and the like. Accordingly, the invention has as its object the provision of a hot cathode fluorescent tube of the type described producing a minimum of flaring light, having high illumination efficiency with respect to an effective extent of the slit and enabling illumination to be stably performed even if the hot cathode filaments vibrate.

To accomplish the aforesaid object, the invention provides a hot cathode fluorescent tube of the slit light emission type comprising a substrate having at least one surface, a fluorescent substance layer and a cylindrical lens located in a path of light beam emitted by the fluorescent substance layer in such a manner that its generating line is parallel to the length of the fluorescent substance layer, wherein a sealed space is defined by the substrate and cylindrical lens, and if necessary, by side plates connected to side edges of the substrate and cylindrical lens.

DESCRIPTION OF THE PREFERRED EMBODIMENTS

Preferred embodiments of the invention will now be described by referring to the accompanying drawings.

Figure 2:
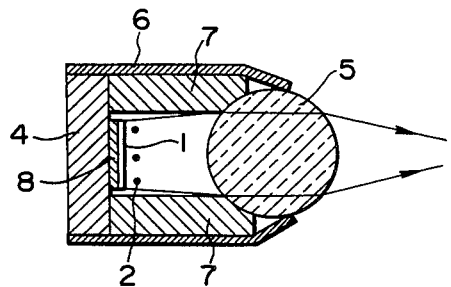
FIG. 2 is a sectional view of a hot cathode fluorescent tube according to the invention, showing its basic construction.

FIG. 2 shows the basic construction of the hot cathode fluorescent tube according to the invention, in which the fluorescent substance layer 1 is superposed on the strip anode 8 supported on the glass substrate 4, and the hot cathode filaments 2 are located above the fluorescent substance layer 1, substantially in the same manner as in the fluorescent tube of the prior art shown in FIGS. 1(a) and 1(b). The fluorescent substance layer 1 emits a light beam which is collected by a cylindrical lens 5 and illuminates an original 12 placed on a slit illumination position. Light reflected by the original in the slit illumination position and constituting an image forming light beam does not pass through the interior of the fluorescent tube again but is reflected to pass in a direction opposite to the direction in which the reflected light beam passes in the prior art, before being incident on an image forming optical system. Thus, the hot cathode fluorescent tube according to the invention is referred to as an "outside image guide type" as contrasted with the "inside image guide type" of the prior art. The outside image guide type offers the advantages that flaring light produced by the reflection of light by the internal surfaces of the tube is reduced in amount and the need to provide a slit along the center line of the fluorescent substance layer 1 and anode 8 is eliminated. In addition, glass of a high degree of transparency need not be used for forming the substrate 4 and opaque ceramic material may be used, and perfectness in flatness is not a primary condition for the substrate. Thus, the hot cathode fluorescent tube according to the invention is advantageous from the point of view of cost as well as strength.

Referring to FIG. 2 again, side plates 7 are located between side edges of the substrate 4 and the cylindrical lens 5, to provide a sealed tube. The cylindrical lens 5 may be in the sectional form of a crescent. A face glass member may be attached to ends of the side plates 7 and the cylindrical lens 5 may be supported on a surface of the face glass member. The side plates 7 which are formed of glass are enclosed by a light shield 6 serving concurrently as a cylindrical lens support member.

In the fluorescent tube of the aforesaid construction, a light beam produced by the fluorescent substance layer 1 is collected by the cylindrical lens 5 and, at the same time, a portion of the light beam that does not contribute to illumination of the original is cut off by the light shield and lens support member 6. This improves the illumination efficiency of the illuminated surface with respect to the illuminating light source, thereby enabling illumination of the original to be performed effectively. In a fluorescent tube of the inside image guide type of the prior art, the path of an image forming light beam from the surface of the original to the image forming optical system passes through the interior of the tube, as described hereinabove. Thus, as shown in FIG. 1(b), the fluorescent tube 10 is located adjacent an incidence section of the image forming optical system 20, so that the face glass member 3 of the fluorescent tube 10 serves as a surface for conveying the original on which a conveyor roller 13 or an original keep-down plate is located. The fluorescent tube of this construction is troublesome to maintain and repair as well as to replace.

Figure 3A:
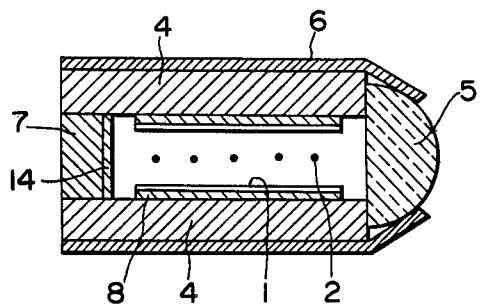
Figure 3B:
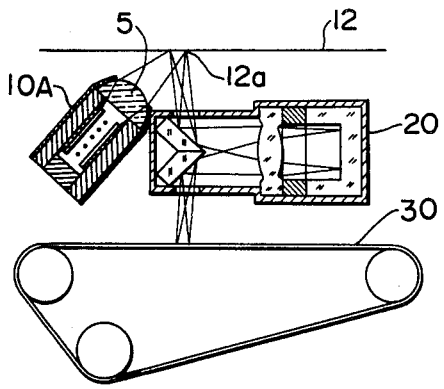

In contrast, when the fluorescent tube according to the invention which is an outside image guide type is used, the surface of the original may be illuminated by a light beam incident obliquely thereon to allow the light beam reflected thereby to be directly incident on the image forming optical system 20, e.g., as shown in FIG. 3(b). This facilitates maintenance and repair of the fluorescent tube as well as replacing an old tube by a new one.

FIGS. 3(a)-6(a) show various constructional forms of the fluorescent tube according to the invention, and FIGS. 3(b)-6(b) each show the arrangement of the fluorescent tube with respect to an image forming optical system. The image forming optical system shown in association with each constructional form of fluorescent tube according to the invention is of the type which uses a roof mirror-lens array which enables the path of light beam to be reduced in length and occuplies a small space. However, the invention is not limited to this specific type of image forming optical system for using its fluorescent tube, and the fluorescent tube of the invention may be used with any other suitable optical system, such as the one using a gradient-index rod lenses array. In FIGS. 3(b)-6(b), a sensitive member 30 is shown as being located in an image forming position. In the case of an image read-out system, a contact type image sensor is located in this position.

In the constructional form shown in FIG. 3(a), the fluorescent units each consisting of the strip anode 8 and the fluorescent substance layer 1 disposed thereon and located on the respective substrates 4 are located parallel to each other on opposite sides of the hot cathode filaments 2, and a fluorescent tube 10A is closed at one end by the cylindrical lens 5 and at the other end by the side plate 7. The side plate 7 has a reflecting layer 14 applied to its inner surface to increase illumination efficiency. The hot cathode filaments 2 emit thermoelectrons which are applied to the fluorescent substance layers 1 on both sides thereof, thereby improving heat generation efficiency. The amount of light used for illumination purposes by this constructional form is stable because vibration of the filaments causes no appreciable change in the integrated amount of light emitted by the fluorescent substance layers 1 on both sides of the filaments 2. FIG. 3(b) shows one manner of arrangement of the fluorescent tube 10A with the image forming optical system, in which the fluorescent tube 10A is located such that the optical axis of the cylindrical lens 5 is oriented in the direction of an illumination position 12a of the original 12. In this arrangement, light reflected by the original 12 is incident on an inlet of the roof mirror-lens array 20 and emerges therefrom through an outlet to form an image on the photosensitive member 30.

Figure 4A:
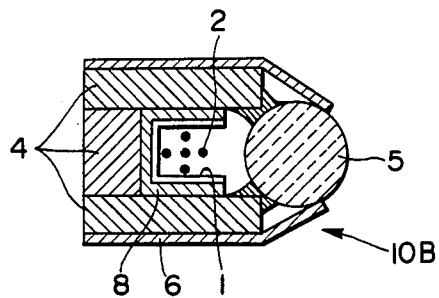
Figure 4B:
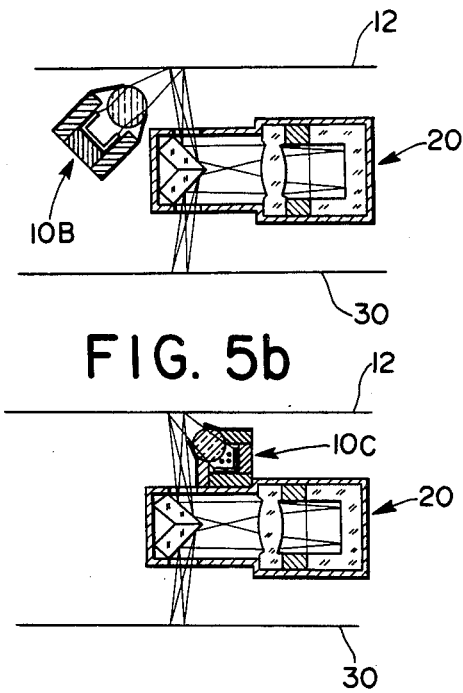

FIG. 4(a) shows another constructional form of fluorescent tube 10B in which the fluorescent unit consisting of the strip anode 8 and the fluorescent substance layer 1 disposed thereon is substantially in the form of a squared letter U in a lying position and supported on the substrate 4 of like configuration, and an open end of the fluorescent tube 10B is closed by the cylindrical lens 5. In this constructional form, the fluorescent tube 10B has its inner surface occupied by the fluorescent substance layer 1 on three sides except for the side on which the cylindrical lens 5 is located, thereby making it possible to reduce the length of the fluorescent tube 10B in its cross section.

Figure 5A:
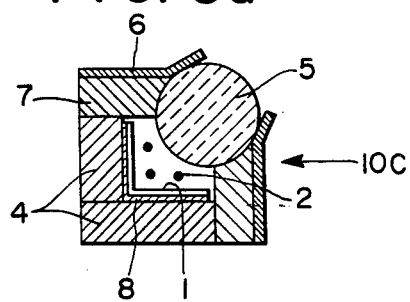
Figure 5B:
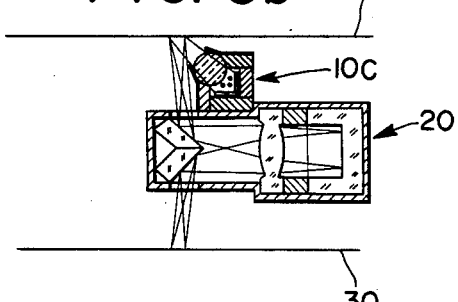

FIG. 5(a) shows still another constructional form of fluorescent tube 10C of substantially square cross-sectional form in which the fluorescent units each consisting of the strip anode 8 and the fluorescent substance layer 1 disposed thereon are substantially in the form of a letter L, and the cylindrical lens 5 is located on the bisector of an angle formed by the two legs of the L. In this constructional form, the cylindrical lens 5 has an optical axis which is at 45 degrees with respect to the substrates 4. Thus, when the fluorescent tube 10C is placed on a casing of the roof mirror-lens array 20 as shown in FIG. 5(b), it is possible to illuminate the surface of the original 12 at an angle of 45 degrees.

Figure 6A:
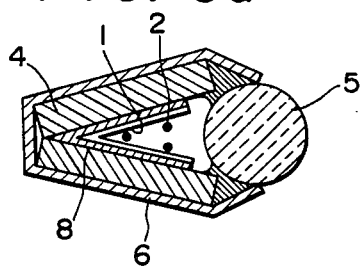
Figure 6B:
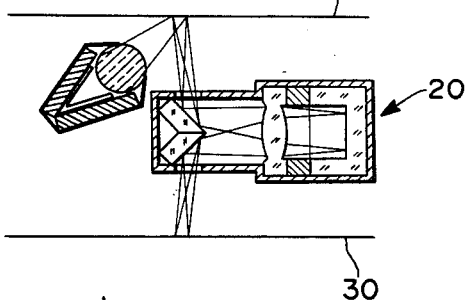

FIG. 6(a) shows a further constructional form in which the fluorescent units each consisting of the strip anode 8 and the fluorescent substance layer 1 disposed thereon and the substrates 4 supporting the respective fluorescent units thereon are located on opposite sides of a fluorescent tube and open at one end to allow the cylindrical lens 5 to be located thereat and connected together at the opposite end. This constructional form eliminates the side plates 7 and reflecting layer 14.

Figure 7:
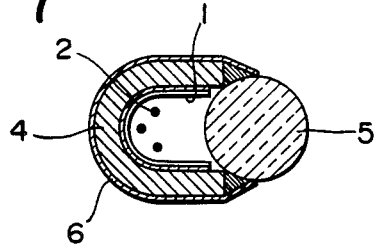
FIG. 7 is a sectional view of a further embodiment of the hot cathode fluorescent tube in conformity with the invention.

FIG. 7 shows a still further constructional form in which the fluorescent unit is substantially in the form of a letter U in a lying position. This constructional form offers the same advantage in the arrangement of the fluorescent tube 10 with the image forming optical system or other system as the constructional form shown in FIG. 3(b).

From the foregoing description, it will be appreciated that the hot cathode fluorescent tube according to the invention which is the outside image guide type is superior to the fluorescent tube of the inside image guide type of the prior art and offers the advantages that flaring light is reduced in amount and that image formation is not adversely affected by the insufficient flatness and by distortion of the surfaces of the face glass member and glass substrate. Thus, the fluorescent tube according to the invention is high in image forming performance and low in cost.

The use of the cylindrical lens for callecting light which may serve concurrently as a face glass member or which may be used in association with a face glass member enables a reduction in illumination efficiency to be avoided when the distance between the fluorescent substance layer and the illuminated surface of an original increases. Also, the provision of more than two surfaces of the fluorescent substance layer enables illumination efficiency to be improved without increasing the number of the hot cathode filaments and allows illumination of an original to be performed with a sufficiently large amount of light even if the filaments may vibrate.

What is claimed is:

1. A slit light emitting type hot cathode fluorescent tube illumination system comprising a substrate having at least one surface, at least one elongated strip anode on said substrate, at least one fluorescent substance layer on said at least one strip anode, and at least one hot cathode filament adjacent said at least one fluorescent substance layer, said at least one hot cathode filament emitting thermoelectrons and applying same to the at least one strip anode to excite the at least one fluorescent substance layer to emit light for illuminating an original by slit illumination, a cylindrical lens which is located in a path of the light emitted by said at least one fluorescent substance layer and has a generating line extending parallel to the length of the at least one fluorescent substance layer, and an enclosure defining a sealed cavity for the fluorescent substrate layer and the at least one hot cathode filament, wherein said lens forms a part of the enclosure and has a surface which defines a wall of the cavity, and wherein the light reflected from the original does not pass through said fluorescent tube illuminating system.

2. An illumination system as in claim 1, wherein said fluorescent substance layer has two surfaces which are spaced from each other and are parallel to and face each other and said at least one filament is disposed between the two surfaces of the fluorescent substance layer to apply thermoelectrons to the two surfaces.

3. An illumination system as in claim 1, wherein said fluorescent substance layer has three surfaces arranged substantially in the form of a squared letter U in cross section, and the cylindrical lens is located adjacent an open end of the space defined by the three surfaces of the fluorescent substance layer.

4. An illumination system as in claim 1, wherein said fluorescent substance layer has two surfaces arranged at right angles to each other, substantially in the form of a letter L in cross section, and said cylindrical lens is located such that its optical axis coincides with the bisector of an angle formed by the two legs of the L.

5. An illumination system as in claim 1, wherein said fluorescent substance layer has two surfaces crossing each other to form an angle having a bisector in alignment with the optical axis of the cylindrical lens.

6. An illumination system as in claim 1, wherein said substrate is substantially in the form of the letter U in cross section, and said fluorescent substance layer is located on the inner surface of the substrate while the cylindrical lens is located at the open end of the U.

7. A hot cathode fluorescent tube illumination system comprising an elongated enclosure defining an elongated cavity and having an elongated cylindrical lens at one long side thereof, said lens having an interior side facing the cavity and defining a wall of the cavity and an exterior side, a substrate having a surface which defines another wall of the cavity and faces the interior surface of the lens, a fluorescent substance layer on said surface of the substrate, and one or more filaments located between at least a part of the layer and the lens to emit thermoelectrons exciting the layer to cause it to emit light toward the lens, said lens focusing said light for use in slit exposure of an original, wherein the light reflected from the original does not pass through said fluorescent tube illumination system.

8. A system as in claim 7 in which the substrate and layer are in the form of two strips which are spaced from each other and are parallel to and face each other, said one or more filaments being between said strips.

9. A system as in claim 7 in which the substrate and layer are in the form of a squared U in cross-section and said lens is adjacent the open side of the U and said one or more filaments are within the U.

10. A system as in claim 7 in which the substrate and layer are L-shaped in cross-section and the long axis of the lens substantially coincides with the plane bisecting the L, and said one or more filaments are within the L, wherein the sides of the L are substantially at a right angle to each other.

11. A system as in claim 10 in which the sides of the L are at an angle of substantially less than 90° to each other.

12. A system for forming an image of an original on a photosensitive member, comprising a hot cathode fluorescent tube having an elongated enclosure defining a cavity and an elongated lens forming one of the sides of the enclosure and a wall of the cavity and further having, in the cavity and facing said lens, at least one anode strip covered with a fluorescent layer and at least one hot cathode disposed in said cavity, wherein the cathode is adapted to emit thermoelectons toward the anode which cause the layer to emit light toward the lens, wherein said lens focuses said light on the original for slit exposure thereof such that light refected from a strip of the original impinges on said photosensitive member, and wherein the light reflected from the original does not pass through said fluorescent tube.

13. A system as in claim 12 in which the lens is a cylindrical lens.

14. A system as in claim 12 in which the tube comprises at least two anode strips covered with respective layers of fluorescent material.

15. A system as in claim 14 in which the two strips are parallel to and face each other, and a plurality of hot cathodes are disposed between them.

16. A system as in claim 14 in which the two strips are at a right angle to each other.

17. A system as in claim 14 in which the two strips are at an angle of less that 90° to each other.

18. A system as in claim 12 in which the strip is U-shaped in cross-section.

19. A system as in claim 12 in which the strip is pi-shaped in cross-section.

* * * * *